(12) United States Patent
Blackwell, Jr. et al.

(10) Patent No.: US 8,426,818 B2
(45) Date of Patent: Apr. 23, 2013

(54) POST-SUPPORTED MICROBOLOMETER PIXEL

(75) Inventors: Richard J Blackwell, Jr., Andover, MA (US); Jeannie Geneczko, Carlisle, MA (US); Tuyet Bach, Catharpin, VA (US); Daniel J O'Donnell, Manassas, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 369 days.

(21) Appl. No.: 12/303,125

(22) PCT Filed: Feb. 1, 2008

(86) PCT No.: PCT/US2008/052744
§ 371 (c)(1),
(2), (4) Date: Dec. 2, 2008

(87) PCT Pub. No.: WO2008/118535
PCT Pub. Date: Oct. 2, 2008

(65) Prior Publication Data
US 2009/0250612 A1    Oct. 8, 2009

Related U.S. Application Data

(60) Provisional application No. 60/899,565, filed on Feb. 5, 2007.

(51) Int. Cl.
*G01J 5/20* (2006.01)
(52) U.S. Cl.
USPC ........................................... 250/338.4
(58) Field of Classification Search ............... 250/338.4, 250/338.1
See application file for complete search history.

(56) References Cited

U.S. PATENT DOCUMENTS

| | | | |
|---|---|---|---|
| 3,909,929 A | * | 10/1975 | Debesis ................... 438/26 |
| 4,996,133 A | | 2/1991 | Brighton et al. |
| 5,459,099 A | | 10/1995 | Hsu |
| 5,929,441 A | * | 7/1999 | Beratan et al. ............ 250/338.3 |

(Continued)

FOREIGN PATENT DOCUMENTS

| WO | WO 2005034248 A1 | * | 4/2005 |
|---|---|---|---|
| WO | WO2005085782 A1 | | 9/2005 |

OTHER PUBLICATIONS

Ahn et al., "A Novel Infrared Abosrbing Structure for Uncooled Infrared Detector," Jan. 30, 2007, Current Applied Physics, vol. 7, pp. 617-621.*
Wolf et al., High Aspect Ratio TSV Copper Filling with Different Seed Layers, Sep. 2008, IEEE, pp. 563-570.*
Mottin et al., "Infrared Microbolometer Sensors and Their Application in Automotive Safety," 2003, Advanced Microsystems for Automotive Applications, pp. 137-157.*

(Continued)

*Primary Examiner* — Christine Sung
(74) *Attorney, Agent, or Firm* — Maine Cernota & Rardin; David A. Rardin; Daniel J. Long (57) ABSTRACT

A post-supported bolometer pixel and a process for manufacturing it comprising the steps of depositing a sacrificial layer over a substrate with readout integrated circuit pads that connect to the integrated circuit; forming vias through the sacrificial layer to the metal pads connecting to the readout integrated circuit; filling the vias with metal and polishing said metal to the surface of the sacrificial layer; forming microbolometer pixel layers over the filled vias and sacrificial layer; and removing the sacrificial layer to leave a post-supported pixel.

14 Claims, 9 Drawing Sheets

U.S. PATENT DOCUMENTS

| | | | |
|---|---|---|---|
| 5,972,108 A * | 10/1999 | Beratan et al. | 117/84 |
| 6,144,030 A | 11/2000 | Ray et al. | |
| 6,307,194 B1 | 10/2001 | Fitzgibbons et al. | |
| 6,489,616 B2 * | 12/2002 | Giedd | 250/338.1 |
| 6,586,738 B2 * | 7/2003 | Dausch et al. | 250/338.3 |
| 6,958,123 B2 * | 10/2005 | Reid et al. | 216/2 |
| 7,115,993 B2 * | 10/2006 | Wetzel et al. | 257/758 |
| 7,177,021 B2 * | 2/2007 | Wang et al. | 356/301 |
| 7,378,655 B2 * | 5/2008 | Tai et al. | 250/338.1 |
| 2004/0188615 A1 | 9/2004 | DeFlumere | |
| 2006/0054823 A1 | 3/2006 | Yon et al. | |

OTHER PUBLICATIONS

PCT Search Report dated Sep. 11, 2008 of Patent Application No. PCT/US2008/52744 filed Feb. 1, 2008.

Uttecht, Ronald R. et al., "A Four-Level-Metal Fully Planarized Interconnect Technology for Dense High Peformance Logic and SRAM Applications", IEEE, 1991, pp. 20-26.

Carter, Kaanta et al., "Submicron Wiring Technology with Tungsten and Planarization", IEEE, 1987, 5 pgs.

08799684.9, Supplementary EP Search Report.

* cited by examiner

Figure 2
(For Figures 1A – 1E)

POST-SUPPORTED MICROBOLOMETER PIXEL

RELATED APPLICATIONS

This application is a US National Phase Patent Application of PCT Application No. PCT/US2008/052744, filed 1 Feb. 2008, which claims the benefit of U.S. Provisional Application No. 60/899,565, filed Feb. 5, 2007. Both of which are herein incorporated in their entirety by reference.

STATEMENT OF GOVERNMENT INTEREST

The present invention was made under Contract Nos. NBCH 0300099 and NBCH 3060004, awarded by the US Army, and the United States Government has certain rights in this invention.

FIELD OF THE INVENTION

The present invention relates to microbolometers and more particularly to microbolometer pixels.

BACKGROUND OF THE INVENTION

In the prior art, a large-area, cone shaped structure has been used to support the pixel above the readout integrated circuit and to also provide electrical interconnect between the pixel and the integrated circuit.

The performance of microbolometer pixels may be degraded by parts of the pixel structure that are necessary but do not contribute to the image signal. One example of this is the pixel contact structure that both physically supports the pixel and provides electrical interconnect from the suspended pixel to the integrated circuit over which the pixel is suspended. Historically, the pixel contact structure is formed as a large, sloped, cone-shaped structure which takes significant area away from the active sensing portion of the pixel. This is especially significant as pixel sizes are reduced.

The prior art method and structure results in a large fraction of the pixel area being used to support the pixel. This support area may not provide a signal and thus may be considered wasted space in the pixel. This large area also may not scale well, and the contact structure represents an even larger fraction of the pixel area as the pixel size is reduced.

A need, therefore, exists for a way to improve microbolometer pixel structure to enhance performance.

SUMMARY OF THE INVENTION

According to embodiments of the present invention, microbolometer performance may be improved by replacing the large, sloped, cone-shaped structure with a small, vertically-sided, for example cylindrical, post. This post structure can provide both mechanical support to suspend the pixel over the integrated read out circuit and provide electrical interconnect between the pixel and the integrated circuit. These support posts can be fabricated using a novel sequence of standard filling techniques found in silicon chip processing.

Embodiments of the process used to manufacture the pixel of this invention include the steps of providing a substrate, depositing a sacrificial layer, forming vias through the sacrificial layer, filling the vias with metal, removing excess material, forming a microbolometer pixel structure over the filled vias, and removing the sacrificial layer, leaving a post-supported pixel.

Those skilled in the art will appreciate that the process of the present invention can provide support posts and electrical contacts less than 2 microns wide and less than 4 square microns in area. The reduced area of the new method allows the area formerly used by the larger contact/support structures to be used for active sensing areas of the pixels which improves the performance of current technology and enables it to be scaled to pixel sizes for next generation products.

An embodiment of the invention provides a method for manufacturing at least one microbolometer pixel comprising the steps of providing a substrate with at least one readout integrated circuit pad operatively connected to at least one readout integrated circuit; depositing a sacrificial layer over the substrate; forming at least one via through the sacrificial layer to the at least one readout integrated circuit pad; filling the via with metal and polishing the metal to the surface of the sacrificial layer; forming at least one microbolometer pixel layer over the filled via and the sacrificial layer; and removing the sacrificial layer to leave at least one post-supported microbolometer pixel. Embodiments include aluminum, tungsten, and plated metals. Embodiments also employ a chemical-mechanical polishing step. Other embodiments include an organic material or dielectric material for the sacrificial layer. In further embodiments, the via is formed by photo patterning and etching. Embodiments may also provide a cross section of the via of about 0.2 to 2 microns.

Yet another embodiment includes a pixel support structure comprising: a post having substantially parallel sides disposed between a substrate and microbolometer pixel. It can further comprise a circuit pad disposed between the post and the substrate. Another embodiment includes a readout integrated circuit disposed on the substrate in electrical contact with the circuit pad.

A further embodiment is an infrared microbolometer sensor system comprising a focal plane array (FPA) comprising a plurality of pixels, each having a plurality of posts having substantially parallel sides disposed between a substrate and a microbolometer pixel wherein a circuit pad is disposed between the post and the substrate. A readout integrated circuit is disposed on the substrate in electrical contact with the circuit pad. In other embodiments, the post has a width of about 0.3 microns, the focal plane array (FPA) has a fill factor of about 72 percent, the frame rate is about 60 hertz, and the embodiment comprises nitride. In embodiments, the nitride has a thickness of about 1,500 to 2,000 angstroms. For further embodiments, the system operates in a wavelength band within about 7 to 14 microns and the focal plane array (FPA) dimensions are 640 by 480 pixels.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A process for manufacturing a microbolometer pixel contact according to the present invention is described follows.

A sacrificial layer is deposited over a read-out integrated circuit. A via hole is formed in the sacrificial layer. The via is then filled with metal. Excess metal over the via is removed, leaving the via hole filled flush to the top with the fill metal and excess metal removed. The micromechanical pixel structure is then formed as normal over the sacrificial layer. Finally, the sacrificial layer is removed to leave the pixel structure supported and electrically connected by the metal post created from the filled via.

Figure 1A:
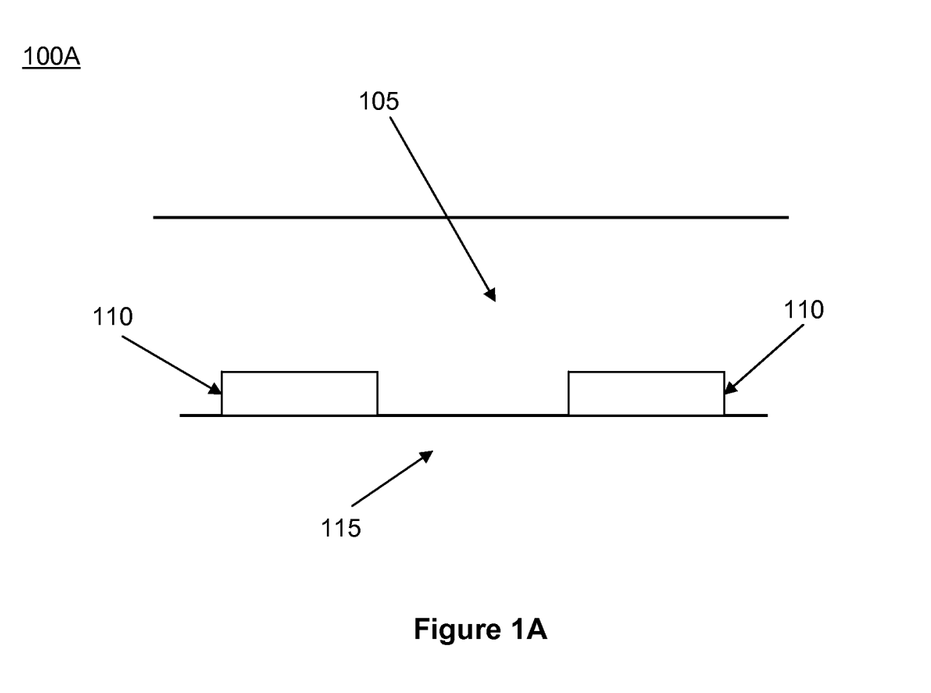
FIGS. 1A through 1E constitute a sequence of schematic drawings showing the steps in the process of manufacturing an embodiment of the present invention.

Referring specifically to the structure 100A of FIG. 1A, a sacrificial layer 105 is deposited over substrate 115 with readout integrated circuit and metal pads 110 that connect to the integrated circuit. The sacrificial layer 105 may, for example, be a dielectric such as silicon dioxide, or organic, such as polyimide.

Figures 1A, 1B, 1C, 1D, 1E, 2:
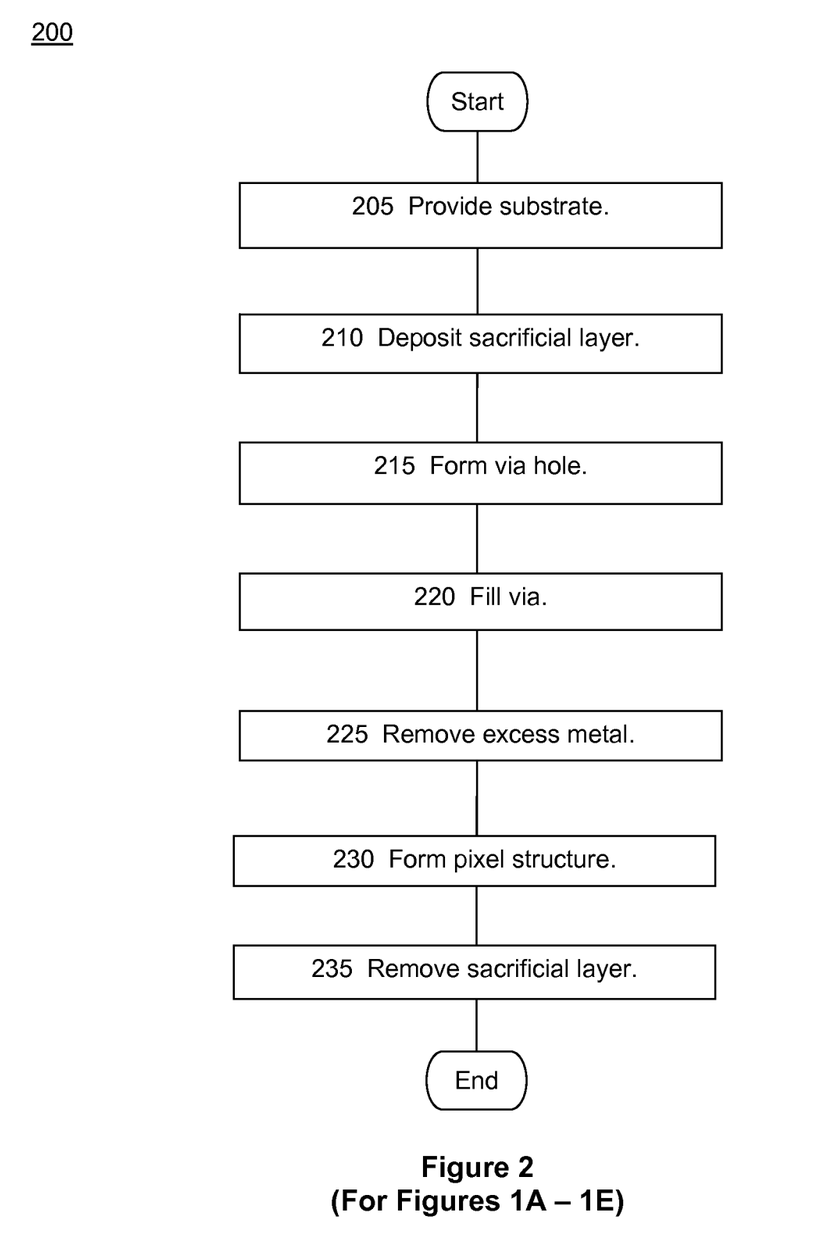
FIG. 2 is a flow chart of an embodiment of the process of FIGS. 1A through 1E.
Figure 1B:
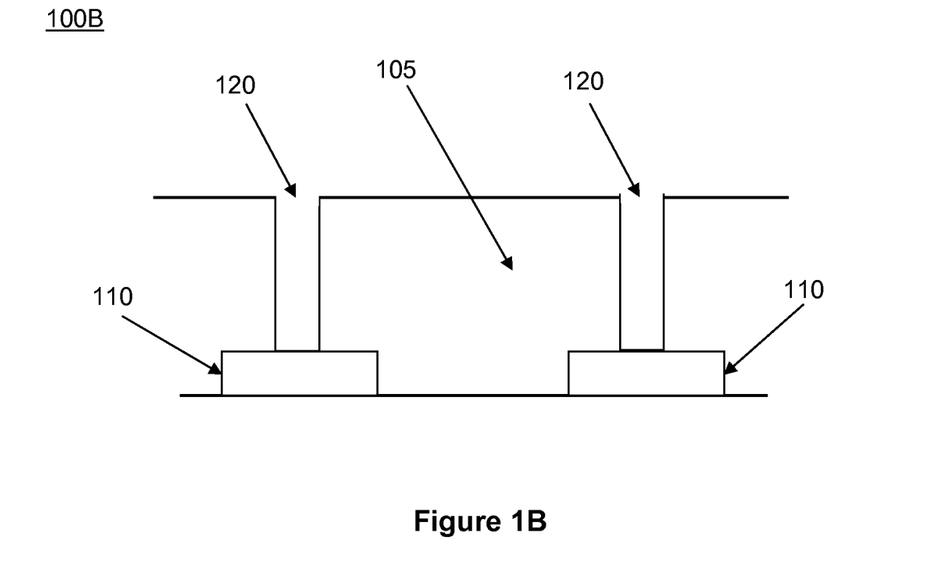
Figure 1C:
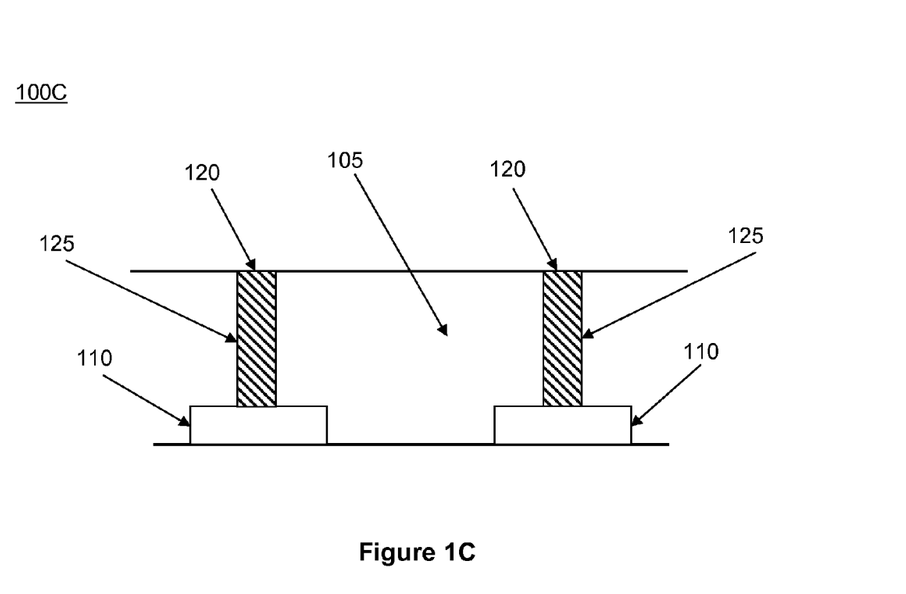
Figure 1D:
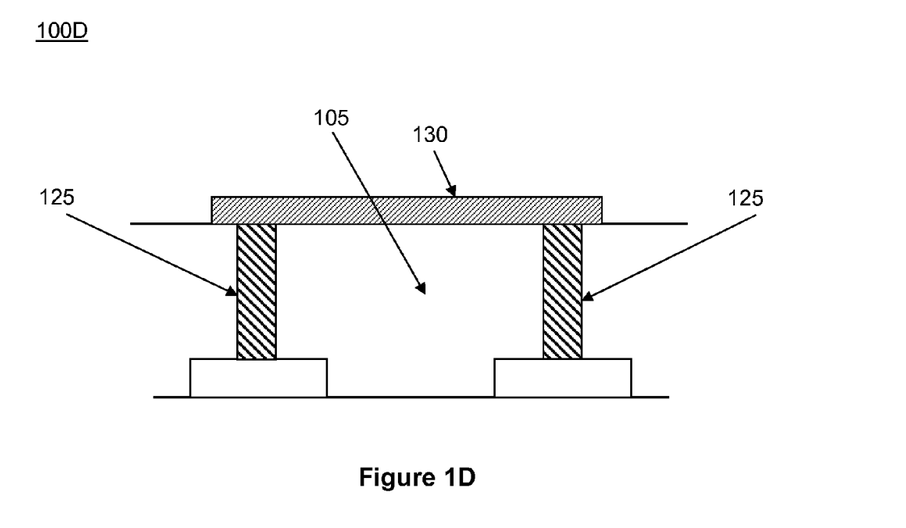
Figure 1E:
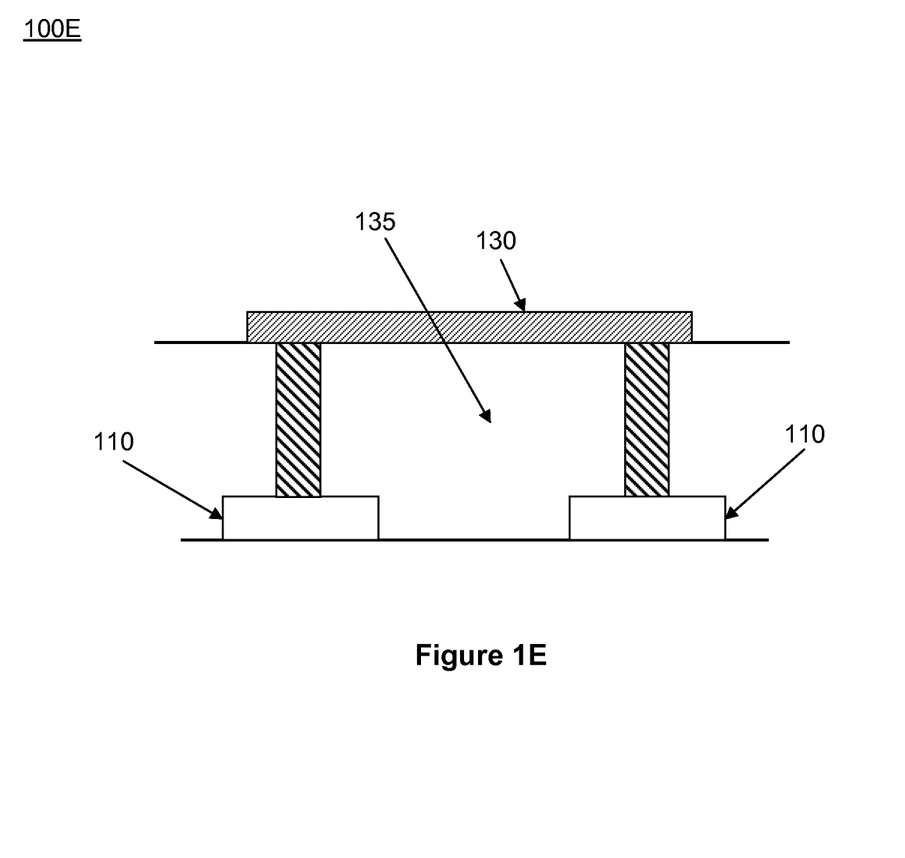

In FIG. 1B configuration 100B, vias 120 are formed through the sacrificial layer 105 to the readout integrated circuit in the substrate. This may employ standard integrated circuit (IC) processing techniques such as, for example, photo patterning and etching. The vias 120 are, for example, about 0.5 to 2.0 microns.

FIG. 1C depicts the configuration 100C where vias 120 are filled with metal 125 and polished to the surface of the sacrificial layer 105. The vias 120 can be filled, for example, using a technique such as aluminum force-fill or tungsten chemical vapor deposition (CVD) or plating. Excess metal over the via can be removed, for example, using standard chemical-mechanical polishing techniques (CMP) that leave the via hole filled flush to the top with the fill metal.

Referring to configuration 100D of FIG. 1D, at least one microbolometer pixel layer 130 is formed over the metal filled vias 125 and sacrificial layer 105. The micro-mechanical pixel structure 130 is formed as is known in the art over the sacrificial layer 105 with the pixel structure 130 attached physically and electrically to the top of the metal 125 in the filled via 120.

In FIG. 1E, configuration 100E, the sacrificial layer is removed 135, leaving a post-supported pixel structure 130. The pixel structure 130 is supported and electrically connected by the metal posts formed from the filled vias. The post is now a free-standing metal stud supporting the pixel structure and electrically connecting the read out integrated circuit to the pixel structure through metal pads 110.

FIG. 2 depicts a flow chart 200 of an embodiment of the microbolometer support fabrication process. It includes the steps of providing a substrate 205, depositing a sacrificial layer 210, forming vias through the sacrificial layer 215, filling the vias with metal 220, removing excess material by polishing to the surface of the sacrificial layer 225, forming microbolometer pixel structure over the filled vias and sacrificial layer 230, and removing the sacrificial layer 235, leaving a post-supported pixel.

This process was used to produce imaging demonstrations, including using standard 640×480 readout integrated circuits.

Figure 3:
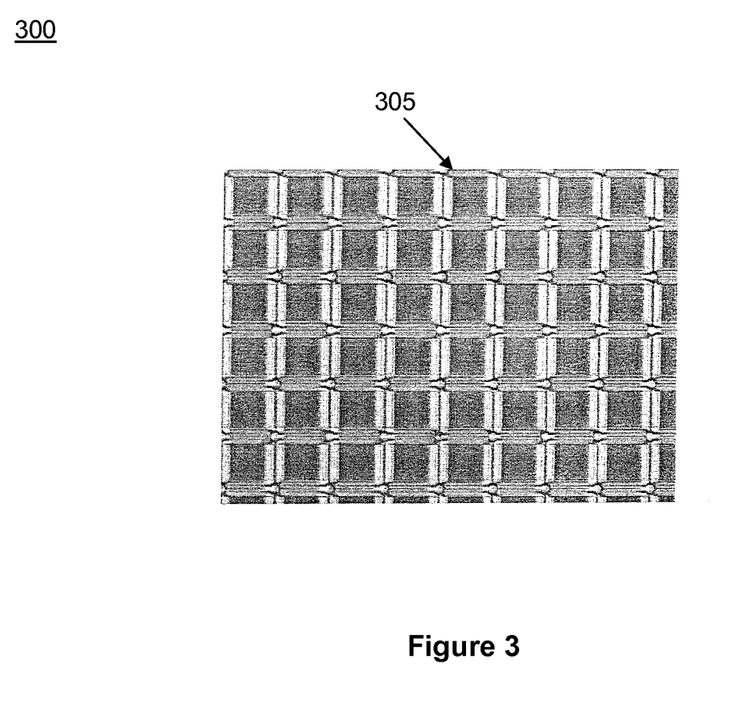
FIG. 3 shows an optical image of pixels produced by an embodiment of this invention.

FIG. 3, 300 shows optical image 305 of pixels produced by an embodiment of this invention.

Figure 4A:
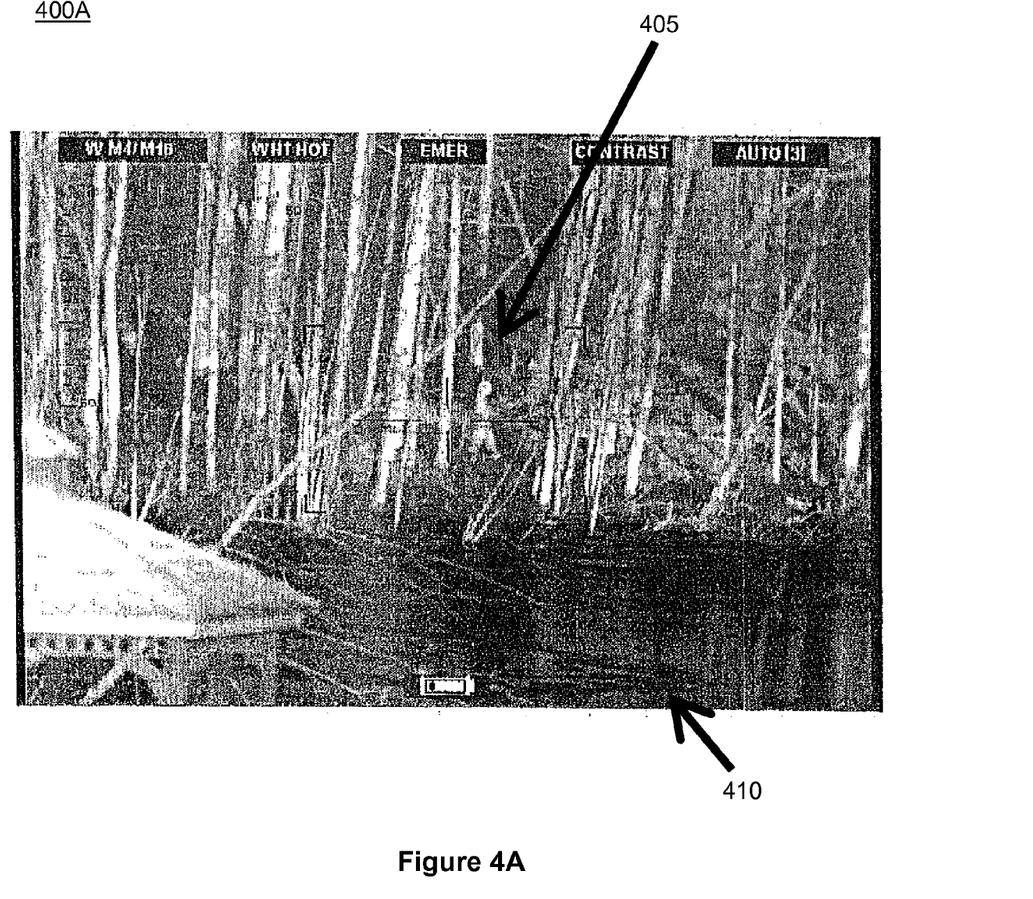
FIGS. 4A through 4D are samples of imagery from an embodiment of a focal plane array (FPA) in a production thermal imaging system.
Figure 4B:
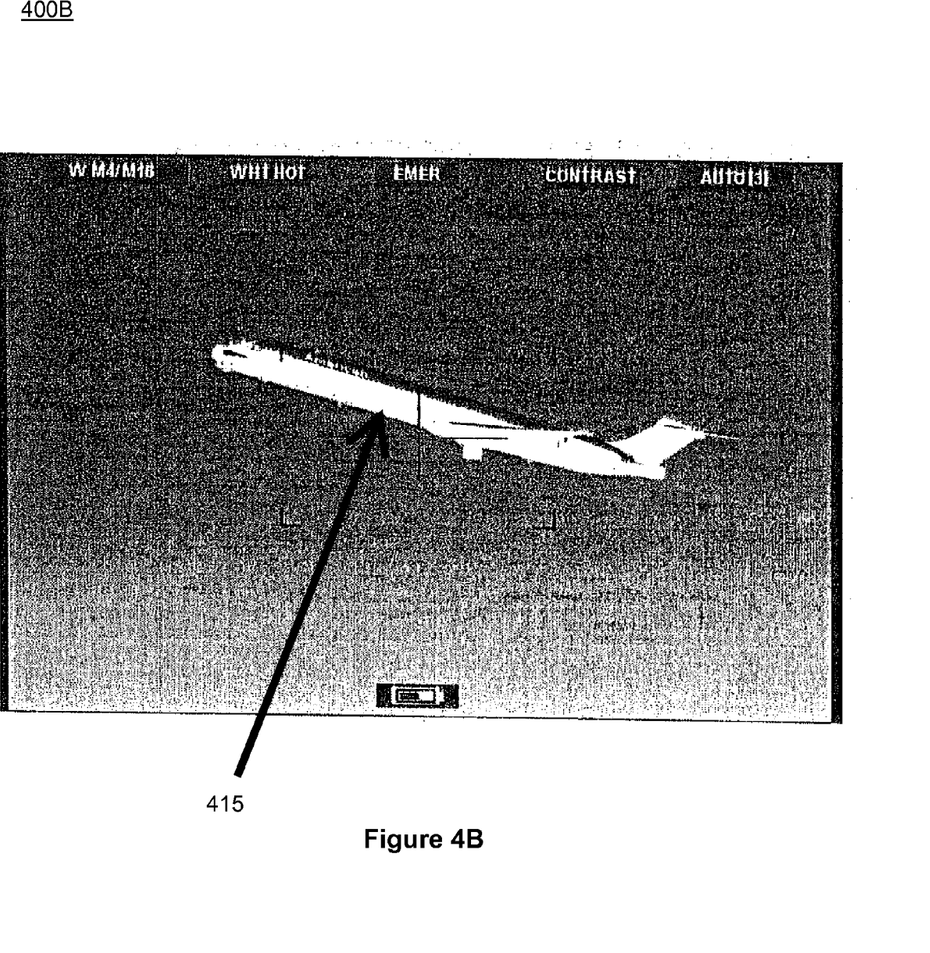
Figure 4C:
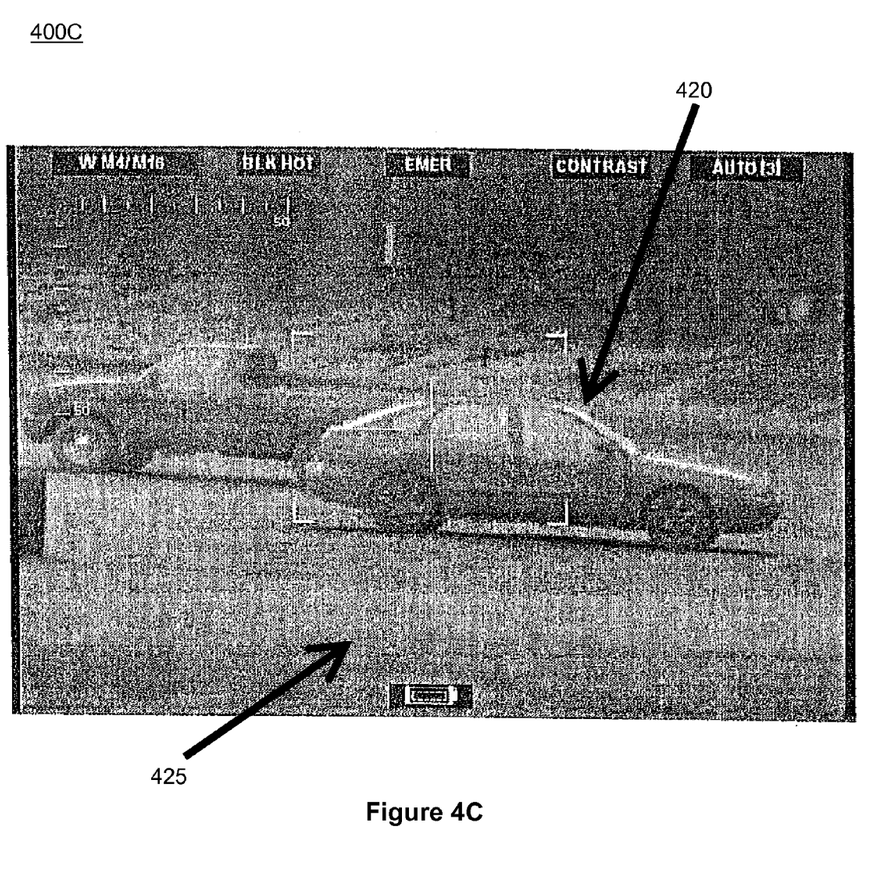
Figure 4D:
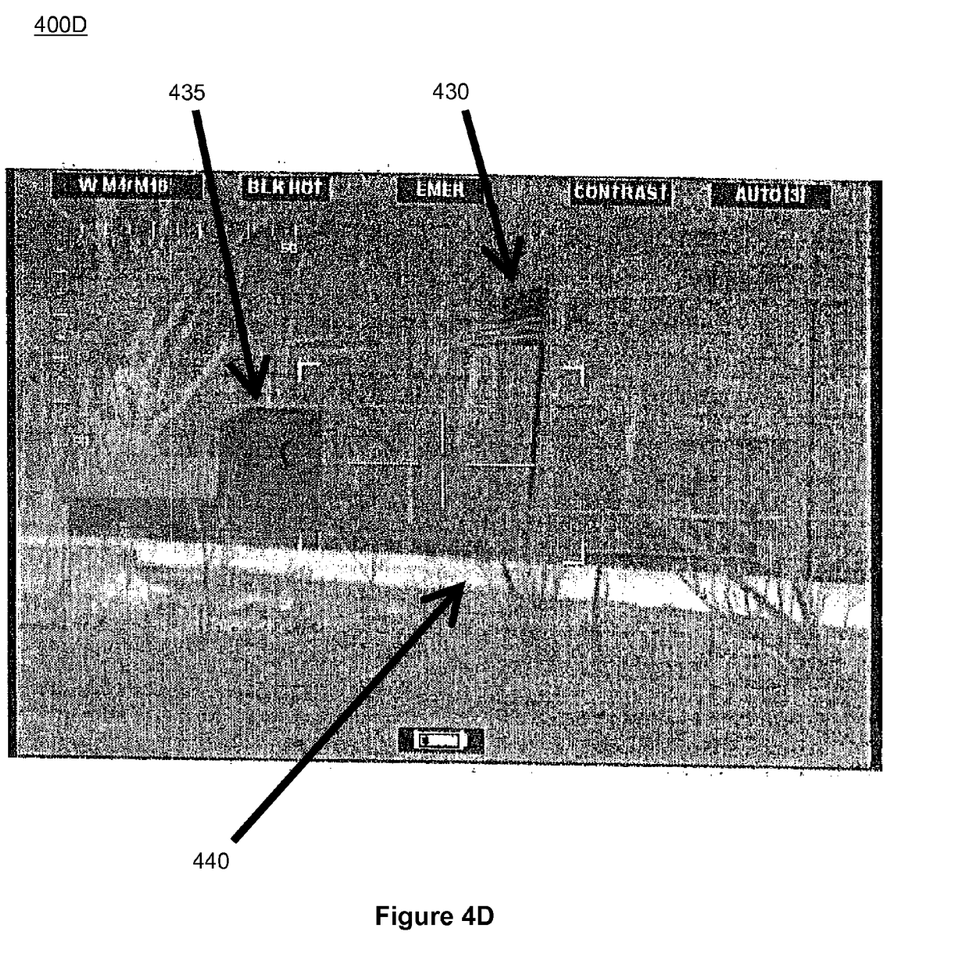

FIGS. 4A-4D show still images 400A, 400B, 400C, and 400D from a production infrared camera using a 17-μm FPA. In FIG. 4A, there is a man 405 in the woods beyond the pond 410. In FIG. 4B an airplane 415 is taking off. In FIG. 4C, a car 420 in a parking lot 425 is shown. In FIG. 4D, there is a flag 430 with buildings 435 with a road 440 in the foreground.

In summary, pixel contacts of the present invention were incorporated in 17-μm microbolometer focal plane arrays (FPAs) and demonstrated in standard production infrared cameras where they produced the presented imagery.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for manufacturing at least one submicron microbolometer pixel comprising the steps of:
    providing a substrate with at least one readout integrated circuit pad operatively connected to at least one readout integrated circuit;
    depositing a sacrificial layer over said substrate;
    forming at least one post via through said sacrificial layer to said at least one readout integrated circuit pad;
    filling said at least one post via with metal wherein post formed by said at least one metal filled post via has substantially parallel sides and comprises a filled post via hole filled at least flush to top of said post;
    polishing said metal to surface of said sacrificial layer;
    forming at least one microbolometer pixel layer over said at least one filled post via and said sacrificial layer; and
    removing said sacrificial layer to leave at least one post-supported microbolometer pixel, creating at least one free-standing metal post with a cross section width of about 0.2 micron to about 2 microns, supporting a pixel structure of said at least one microbolometer pixel layer,
    said post comprises no void greater than 0.2 micron to 2 microns corresponding to said cross section of said at least one free-standing metal post whereby structural integrity is maintained to support said at least one microbolometer pixel layer;
    wherein axis of said cross-section is along vertical axis of said at least one free-standing metal post, perpendicular to plane of said substrate.

2. The method of claim 1, wherein said metal of said post is aluminum; and
    wherein cross section of electrical contact pads correspond to said cross section widths of said free-standing metal posts,
    wherein electrical contact pads have a cross section width between about 0.2 microns to about 2 microns corresponding to said cross section widths plus alignment tolerance of said free-standing metal posts,
    wherein axis of said cross-section is along vertical axis of said at least one free-standing metal post, perpendicular to plane of said substrate.

3. The method of claim 1, wherein said metal of said post is tungsten.

4. The method of claim 1, wherein said metal of said free-standing post is electro-plated.

5. The method of claim 1, wherein said step of filling said at least one post via comprises aluminum force-fill,
    wherein an aluminum metal layer is deposited over a surface containing said at least one post via, said aluminum metal layer then subject to conditions sufficient to force said aluminum into said at least one post via to completely fill said at least one post via.

6. The method of claim 3, wherein said step of filling said at least one post via comprises tungsten chemical vapor deposition (CVD).

7. The method of claim 1, wherein said post via is formed by photo patterning and etching, and said polishing step is chemical-mechanical polishing.

8. An infrared submicron microbolometer sensor system comprising a focal plane array (FPA) comprising:
- a plurality of pixels, each having a plurality of posts having substantially parallel sides, disposed between a substrate and a microbolometer pixel, wherein a circuit pad is disposed between said post and said substrate and said posts support said pixels;
- wherein said posts comprise rigid posts filled at least flush to top of said post;
- wherein each of said posts is a free-standing metal post with a cross section width of about 0.2 micron to about 2 microns, supporting a pixel structure of said at least one microbolometer pixel, whereby fill factor is increased up to about 72 percent by area;
- said rigid posts comprise no void greater than 0.2 micron to 2 microns corresponding to said cross section of said at least one free-standing metal post whereby structural integrity is maintained to support said at least one microbolometer pixel layer;
- wherein axis of said cross-section is along vertical axis of said at least one free-standing metal post, perpendicular to plane of said substrate; and
- a readout integrated circuit disposed on said substrate in electrical contact with said circuit pad.

9. The system of claim 8 wherein said post has a width of 0.3 microns.

10. The system of claim 8, wherein said focal plane array (FPA) has a fill factor of about 72 percent.

11. The system of claim 8, wherein said rigid posts comprise aluminum force-fill metal,
- wherein an aluminum metal layer is deposited over a surface containing said at least one post via, said aluminum metal layer then subject to conditions sufficient to force said aluminum into said at least one post via to completely fill said at least one post via.

12. The system of claim 11, wherein said rigid posts comprise tungsten chemical vapor deposition (CVD) metal.

13. The system of claim 8, operating in wavelength band within about 7 to 14 microns.

14. The system of claim 8, wherein said free-standing rigid posts comprise electro-plated metal.

* * * * *